(12) United States Patent
Worrell et al.

(10) Patent No.: US 6,571,154 B2
(45) Date of Patent: May 27, 2003

(54) METHOD AND APPARATUS FOR ACCESSING VEHICLE SYSTEMS

(75) Inventors: Barry C. Worrell, Centerville, OH (US); Kevin S. Buchanan, Springboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/948,017

(22) Filed: Sep. 6, 2001

(65) Prior Publication Data

US 2002/0116094 A1 Aug. 22, 2002

Related U.S. Application Data

(60) Provisional application No. 60/269,904, filed on Feb. 20, 2001.

(51) Int. Cl.[7] .............................................. G06F 19/00
(52) U.S. Cl. ............................. 701/1; 701/36; 701/49; 345/840; 74/479.01
(58) Field of Search .............................. 701/1, 36, 41, 701/49; 345/156, 840, 841; 74/479.01, 484 R, 552

(56) References Cited

U.S. PATENT DOCUMENTS

| | | | |
|---|---|---|---|
| 2,793,262 A | 5/1957 | Albert | 200/61.57 |
| 3,544,743 A | 12/1970 | Takei et al. | 200/61.54 |
| 4,503,528 A * | 3/1985 | Nojiri et al. | 367/198 |
| 4,792,783 A * | 12/1988 | Burgess et al. | 340/22 |
| 5,335,743 A | 8/1994 | Gillbrand et al. | 180/178 |
| 5,520,066 A | 5/1996 | Tueri | 74/484 |
| 5,638,060 A * | 6/1997 | Kataoka et al. | 341/20 |
| 5,808,374 A | 9/1998 | Miller et al. | 307/10.1 |
| 5,855,144 A | 1/1999 | Parada | 74/552 |
| 5,949,149 A | 9/1999 | Shitanaka et al. | 307/10.1 |
| 6,046,932 A * | 5/2000 | Francois | 701/49 |
| 6,104,101 A | 8/2000 | Miller et al. | 307/10.1 |
| 6,240,347 B1 * | 5/2001 | Everhart et al. | 701/36 |
| 6,373,472 B1 * | 4/2002 | Palalau et al. | 345/173 |

* cited by examiner

Primary Examiner—Tan Q. Nguyen
(74) Attorney, Agent, or Firm—Kathryn A. Marra

(57) ABSTRACT

A method for engaging a plurality of control systems in a vehicle, enabling a main menu of a main control program; providing a means for scrolling through a plurality of selections of the main menu; providing an audible text messages for each of the plurality of selections, the audible text messages are activated as an individual scrolls through the plurality of selections; and providing a selector switch for selecting one of the plurality of selections. The means for scrolling through the plurality of selections is located on an upper surface of a spoke of a steering wheel and the selector switch is located on a lower surface of the spoke. The method also includes providing a visual representation of the main menu.

27 Claims, 4 Drawing Sheets

METHOD AND APPARATUS FOR ACCESSING VEHICLE SYSTEMS

CROSS REFERENCE TO RELATED APPLICATIONS

This application claims the benefit of U.S. provisional patent application 60/269,904 filed on Feb. 20, 2001 the contents of which are incorporated herein by reference thereto.

TECHNICAL FIELD

The present invention is related generally to a method and apparatus for accessing vehicle systems. More particularly, a method and apparatus with an audio and/or video presentation that provides a means for accessing vehicle systems.

BACKGROUND

As vehicles become more complex there is a corresponding increase in operating systems required for operation of the vehicle systems and subsystems.

SUMMARY OF THE INVENTION

A control system for a vehicle having a visual display for providing selectable options corresponding to vehicle subsystems, the system is operated via a controller for activating the visual display, the controller is positioned on a spoke of a steering wheel and provides a means for selecting the selectable options of the visual display. A plurality of prerecorded text messages corresponding to a plurality of selectable menus from the visual display are sounded as each of the selectable menus is highlighted by the controller.

In one embodiment the controller comprises: a scroll switch;
  a selector switch; and an escape switch. The scroll switch and the escape switch are positioned on an upper surface of the spoke of the steering wheel and the selector switch is positioned on a lower surface of the spoke. The selector switch is easily manipulated by an index finger of individual's hand and the scroll switch and the escape switch are easily manipulated by an individual's thumb when they are grasping the steering wheel.

A method for engaging a plurality of control systems in a vehicle, comprising: enabling a main menu of a main control program; providing a means for scrolling through a plurality of selections of the main menu; providing an audible text messages for each of the plurality of selections, the audible text messages are activated as an individual scrolls through the plurality of selections; and providing a selector switch for selecting one of the plurality of selections. The means for scrolling through the plurality of selections is located on an upper surface of a spoke of a steering wheel and the selector switch is located on a lower surface of the spoke. The method also includes providing a visual representation of the main menu.

The above-described and other features and advantages of the present invention will be appreciated and understood by those skilled in the art from the following detailed description, drawings, and appended claims.

DETAILED DESCRIPTION OF THE PREFERRED EMBODIMENTS

Figure 1:
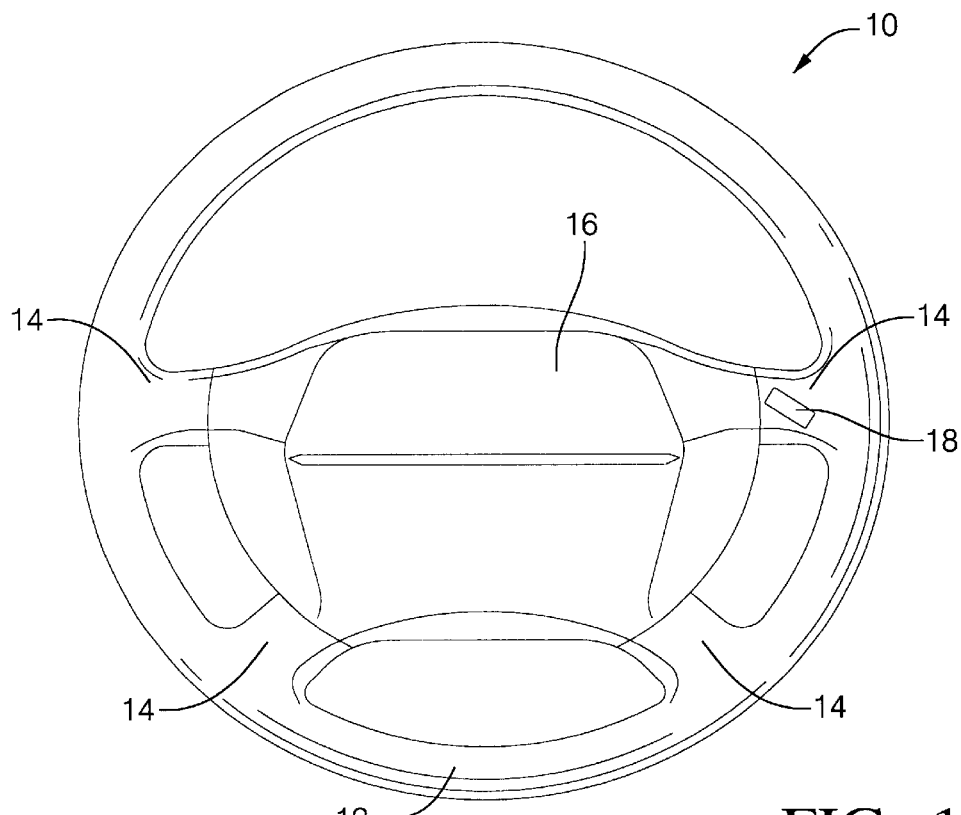
FIG. 1 is a top plan view of steering wheel illustrating a location of a scroll switch in accordance with an exemplary embodiment of the present invention.

Referring now to FIG. 1, a steering wheel 10 is illustrated. Steering wheel 10 includes a rim portion 12 having a plurality of spoke portions 14. Spoke portions 14 connect rim portion 12 to a center portion 16. In accordance with an exemplary embodiment, a system interface mechanism 18 is located on one of the spoke portions of steering wheel 10.

In an exemplary embodiment, system interface mechanism 18 is located on an upper spoke portion in a four spoke configuration. Accordingly, the system interface mechanism is actuatable by an individual's thumb and index finger as they are grasping steering wheel 10. Thus, system interface mechanism 18 is oriented for manipulation while steering wheel 10 is in an unturned or center position corresponding to a position in which the steerable wheels of a vehicle are positioned to cause the vehicle to be traveling in a substantially straight direction.

Accordingly, system interface mechanism 18 is actuatable while a vehicle is traveling or coasting in a generally straight direction (e.g. non-turning driving conditions) or is at a stoplight or in a parked vehicle. Thus, system interface mechanism 18 is not accessible while the vehicle operator is repositioning the steering wheel.

Moreover, the positioning system interface mechanism 18 prevents inadvertent activation from the sliding of an operator's hand along the rim portion as they are turning steering wheel 10 in order to redirect the steerable wheels of the vehicle.

Figure 2:
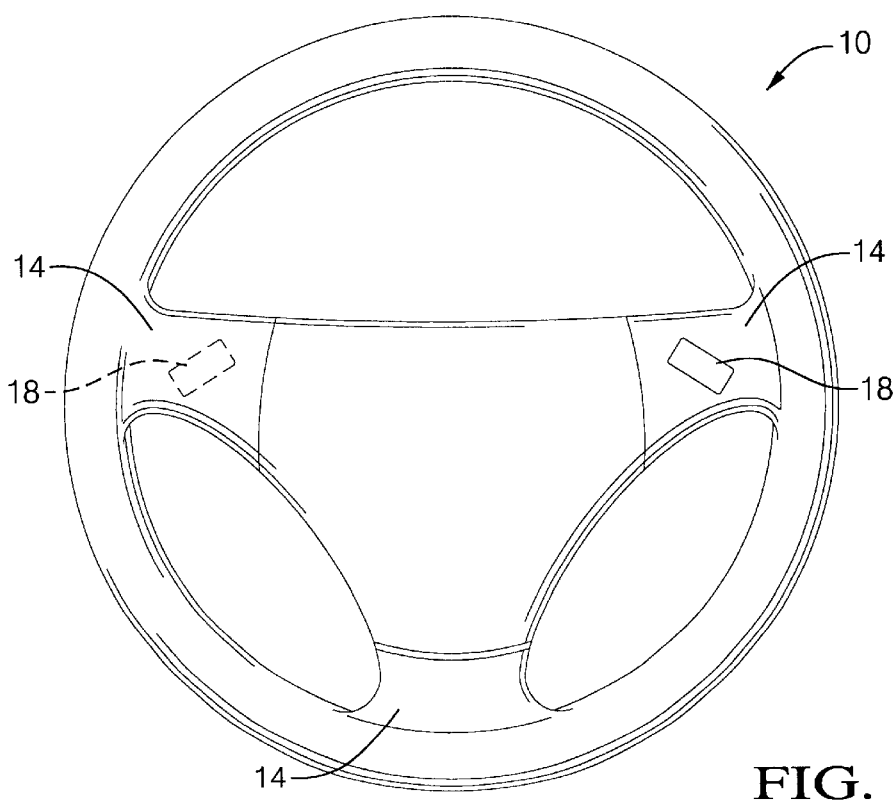
FIG. 2 is a top plan view of an alternative steering wheel illustrating a location of a scroll switch in accordance with an exemplary embodiment of the present invention.

It is contemplated that steering wheel 10 may have more or less than four spoke portions 14. For example, and for purposes of illustration FIG. 2 illustrates a steering wheel 10 with three spoke portions 14. In addition, and as illustrated by the dashed lines in FIG. 1, system interface mechanism 18 is positionable on the left-hand side of steering wheel 10.

Alternatively, steering wheel 10 can be configured with a pair of system interface mechanisms (e.g. one on each side). As illustrated in FIG. 1, system interface mechanism 18 is positioned to have an angular configuration, which is ergonomically positioned and allows the system interface mechanism to be accessed by an individual's thumb and index finger as they are grasping the wheel.

As an alternative, system interface mechanism 18 is positionable in either a more horizontal or vertical direction with respect to spoke portion 14.

Steering wheel 10 and system interface mechanism is contemplated for use in any vehicle having multiple operating systems for individually controlling the same. For example, other vehicles include but are not limited to the following: aircraft; watercraft; automobiles; trucks; sports utility vehicles; and spacecraft ect.

Figure 3:
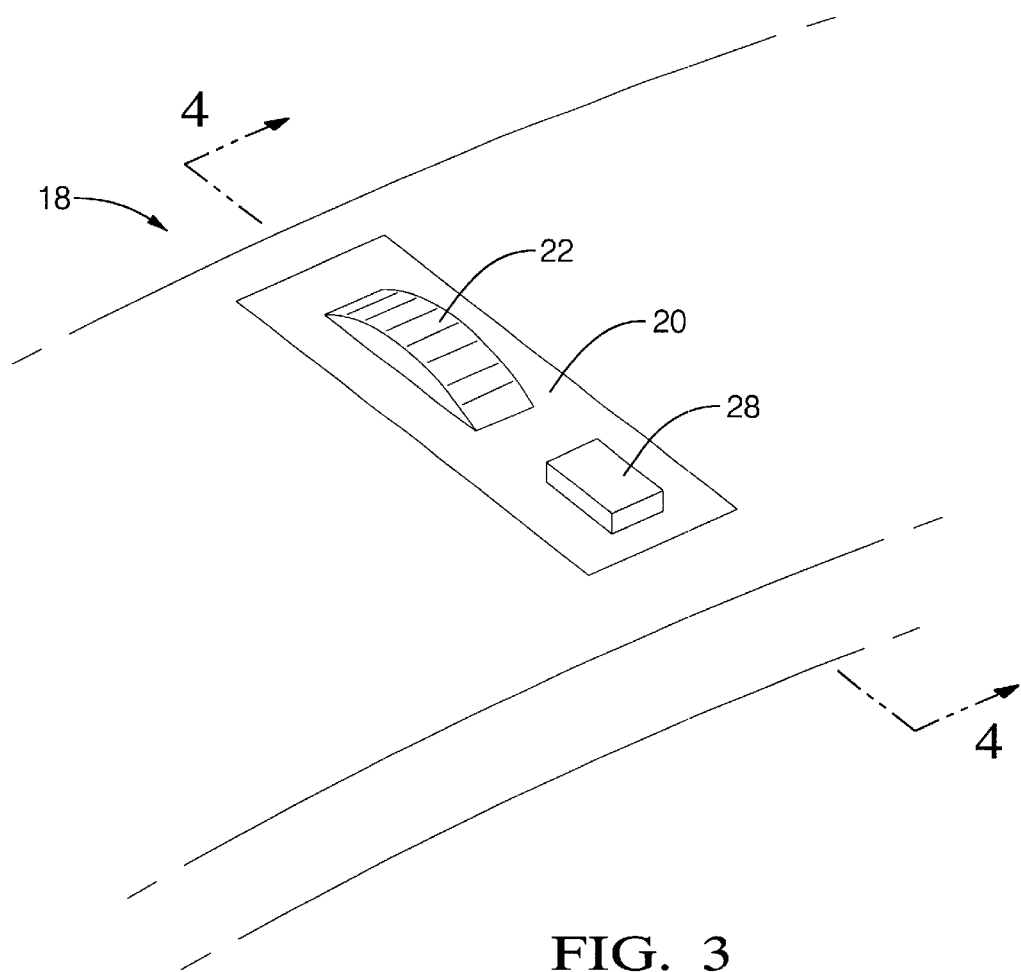
FIG. 3 is a perspective view of a portion of a scroll switch in accordance with an exemplary embodiment of the present invention.
Figure 4:
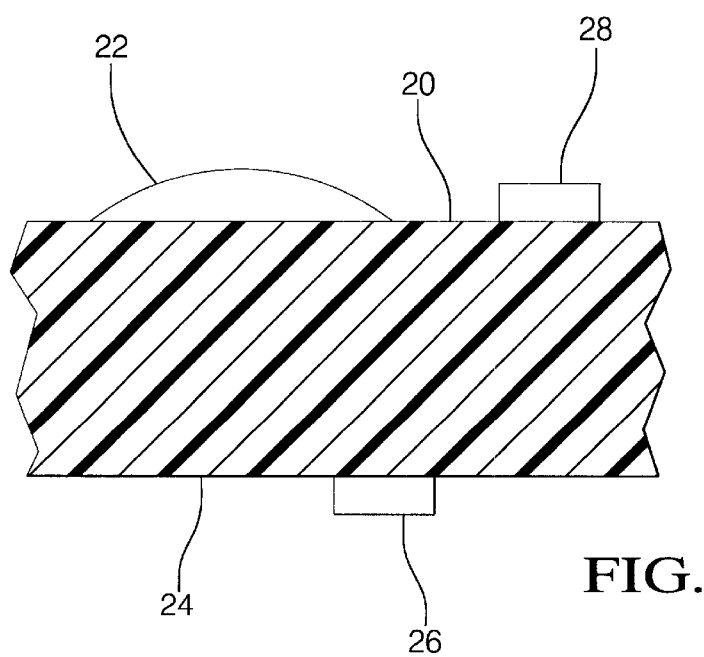
FIG. 4 is view along lines 4—4 of FIG. 3.

Referring now to FIGS. 3 and 4, system interface mechanism 18, includes an upper surface 20 having a browsing means 22. In addition, a selecting means 24 is positioned on a lower surface 26. Lower surface 26 is located on the back surface of spoke portion 14. In addition, upper surface includes a deselecting or escape means 28.

In addition, by positioning selecting means 24 on lower surface 26 inadvertent actuation of selecting means 24 is avoided since the manipulation of browsing means 22 occurs on an opposite surface.

In accordance with an exemplary embodiment, browsing means 22 is a scroll switch, which operates similarly to a computer mouse.

The preferred configuration of system interface mechanism 18 allows manipulation of browsing means 22 by a thumb of an individual's hand, selection of an available option by manipulation of selecting means 24 by an individual's index finger and a means for backing out or escaping from a system by manipulating or depressing a deselecting or escape means 28 by a thumb of an individual's hand.

Figure 5:
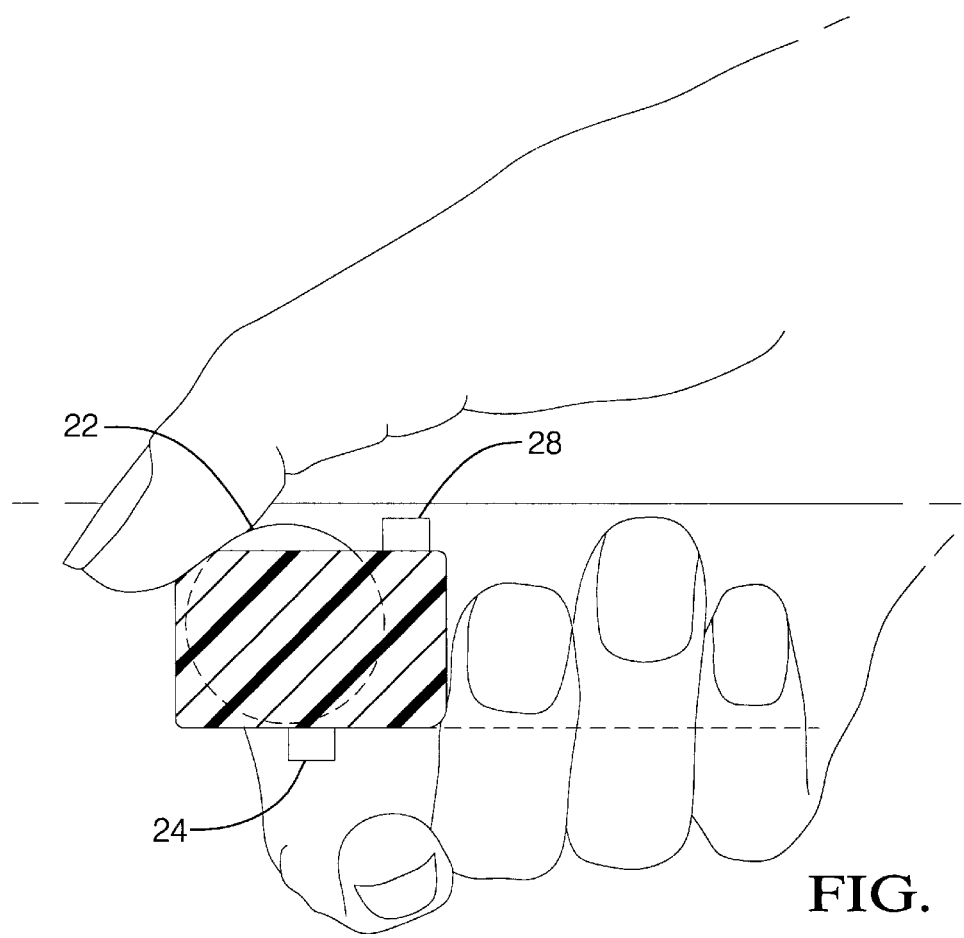
FIG. 5 is view illustrating operation of a scroll switch.

In accordance with an exemplary embodiment browsing means 22 is a rotatable switch that is rotatably mounted within system interface mechanism 18 and provides a portion that extends above action surface 20. Accordingly, the rotatable switch is easily rotated by an individual's thumb as they are grasping steering wheel 10 when it is in the position illustrated in FIG. 1. Such actuation is illustrated in FIG. 5.

The browsing means or scroll switch 22 is configured to have a plurality of notches or sensors which when rotated past a complementary notch or sensor within spoke portion 14 a signal prompting a new selection is generated. Alternatively, scroll switch 22 is replaced by an actuatable slide that also provides a means for generating signals for prompting new selections as the slide is slated from a first position to a second position.

Browsing means 22 allows a vehicle operator to engage or scroll through a plurality of menus of multiple operating systems resident upon a vehicle microprocessor or microprocessors. In addition, and in accordance with an exemplary embodiment, selecting means 24 is a pushbutton device is capable of being activated by an index finger of an individual. Pushbutton device 24 advances or actuates a selection of an operating system that it is currently being selected by browsing means 22.

Figure 6:
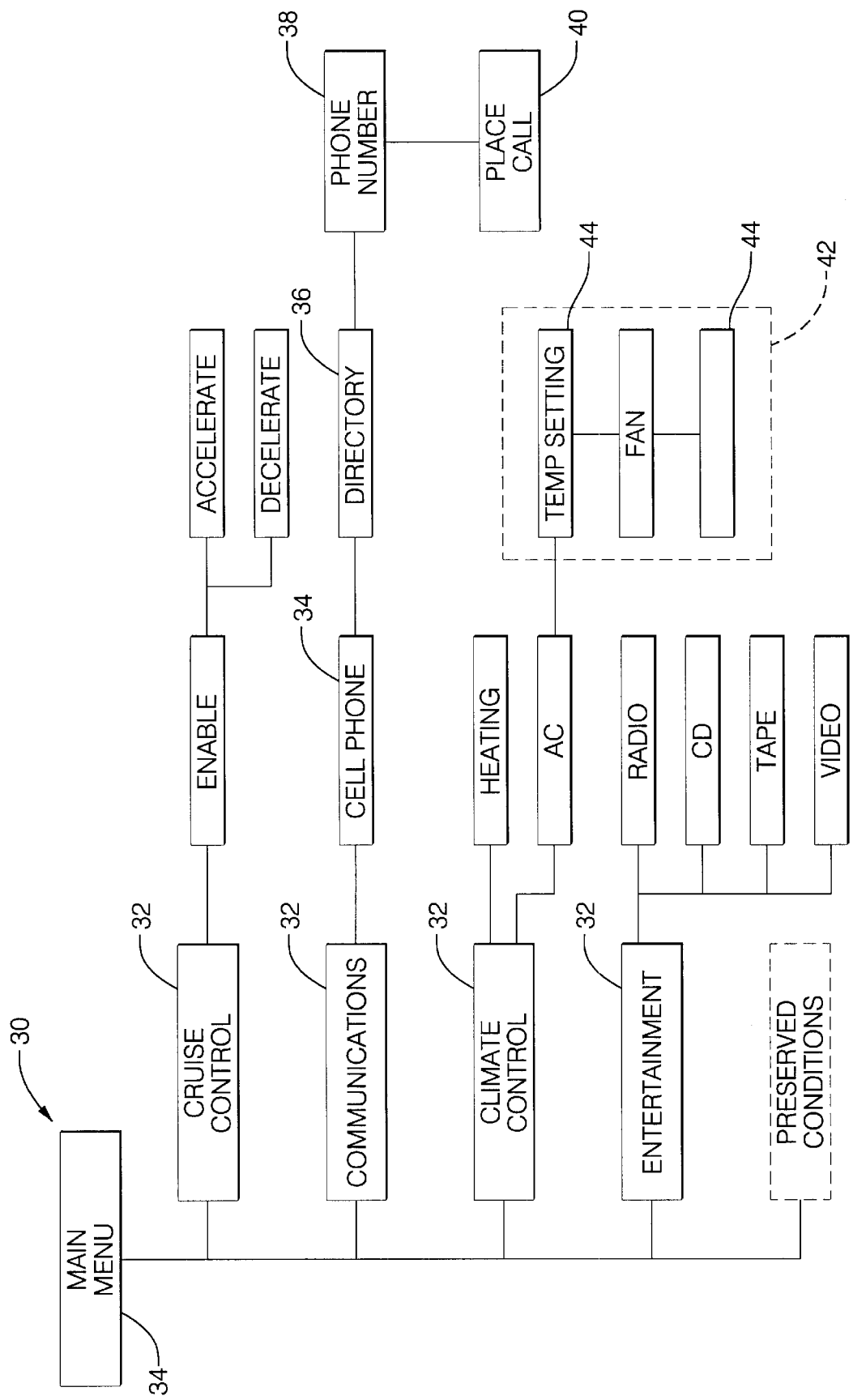
FIG. 6 is diagrammatic view of a control system.

For example, and referring now to FIG. 6, a schematic diagram illustrating portions of an operating system 30 is illustrated. System 30 includes a plurality of subsystems 32 that are accessed through a main menu 34. In accordance with an exemplary embodiment main menu 34 is accessed by initially depressing pushbutton 24 or alternatively rotating browsing means 22 past a default or initial position. This will activate operating system 30.

Main menu 34 is visually provided in a location convenient for observation by a vehicle operator for example, a head up display, a video display, a liquid crystal display. In addition, and in accordance with an exemplary embodiment, operating system 30 is configured to provide an audible signal or speech recording indicating that system 30 has been activated. For example, upon initialization operating system 30 a prerecorded message will play "vehicle operating system activated". In addition, a visually observable menu corresponding to main menu 34 is generated.

Main menu 34 will provide a plurality of selections corresponding to subsystems 32. In accordance with an exemplary embodiment, and after operating system 30 has been initialized, the manipulation of scroll switch 22 will cause the system to run through the plurality of selections corresponding to subsystems 32 for a first tier of selectable items each of which includes multiple sub tiers of selectable items corresponding to subsystems.

Some examples of subsystems 32 include but are not limited to vehicle operating system's such as: cruise control; communications; climate control; and entertainment features.

Movement of the scroll switch all cause one of the subsystems in the menu to be highlighted similar to the functions of a graphic user interface in a personal computer.

In addition, and as the system runs through the plurality of selections, a plurality of prerecorded message will play. Accordingly, and as an individual manipulates browsing means 22 a prerecorded message corresponding to each subsystem will be sounded.

The audible signal allows the operator to know exactly what system they are in without having to read or interpret a display. For purposes of explanation only, and referring now to FIG. 6, once operating system 30 has been initialized by the movement of browsing means 22 to a first position, this first position will cause a pre-recorded message saying "cruise control" of a first tier of options to be initialized.

At this point, further manipulation of browsing means 22 to a second position will cause a prerecorded message saying "communications" of the same first tier of options to be initialized. At this point, and for purposes of explanation, instead of a further manipulating the browsing means, the individual uses their index finger to depress pushbutton switch 24. This action will cause system 30 to advance to a subsystem 34 of the subsystems 32 which was currently selected by the browsing means, in this example corresponding to communications.

At this point subsystem 34 will provide a plurality of selections which again pursuant to the movement of browsing means 22 will cause a plurality of prerecorded text messages to play. For example, and pursuant to this example a prerecorded message "cellphone" will play. Upon hearing that the individual has selected the correct subsystem, the individual again depress pushbutton switch 24 to proceed to yet another subsystem availing multiple selections. For example, and pursuant to this example a subsystem 36 will provide a plurality of selections which again, pursuant to the movement of browsing means 22 will cause a plurality of prerecorded text messages to play. In this example, subsystem 36 relates to a directory of phone numbers.

If however, the operator finds himself or herself in the wrong directory or wishes to leave that system or subsystem escape switch 28 is manipulated.

Actuation of switch 24 advances the user into yet another subdirectory 38 which contains a plurality of phone numbers which, in this example will play audio messages corresponding to the person to which the phone number relates. For example, and if an individual has reached subsystem 38, manipulation of browsing means 22 will cause a plurality of prerecorded text messages corresponding to each phone numbers selection to play. In this example, the prerecorded text messages are user specific as they relate to information entered into system 30 by the vehicle operator.

For example, a prerecorded text message "John Smith" is recorded into the system by the operator thus, as browsing means 22 scrolls through the plurality of options in subsystem 38 the prerecorded messages corresponding to the individual names will be played. Once the proper name has been selected, the individual depresses switch 24 to reach yet another subsystem 40 which in this example provides a plurality of options with a plurality of corresponding prerecorded text messages. Here some of the options available are "place call" or "edit information".

Thus, and as a final step in this example a selection of "place call" will instruct a cellular phone of the vehicle to call John Smith. This feature provides a unique means for hands-free operation of a cellular phone.

In order to back out or escape from a subsystem or operating system 30, the user simply depresses pushbutton switch 28 which due to its location is conveniently accessed by an individual's thumb.

In addition to the audio signals presented by manipulation through each of these subsystems of operating system 30, a visually presentable menu is provided for observation by the system operator.

Is noted that the previous example (e.g. cellphone operation) is contemplated for use with a system employing voice recording capabilities and/or voice recognition software. For example, the entry of John Smith's phone number and the corresponding prerecorded text. Alternatively, system 30 is provided with or intermeshes with a non-system recordable system or a system having prerecorded text being factory installed.

For example, and referring again to FIG. 6, a user accessing system 30 can select subsystem 32 corresponding to "climate control" which upon hearing the audible message "climate control" or visually seeing the video display selection corresponding to climate control, the user enters the subsystem by depressing switch 24 and as provided in the example illustrated in FIG. 6, a pair of subsystems are available for selection. Here the manipulation of browser means 22 allows a selection of either heating or air-conditioning, each having a prerecorded message and video display.

A selection of air-conditioning advances the user to subsystem 42 having a plurality of subsystems 44 each with a prerecorded text message. Thus, an individual may browse through the subsystems of subsystem 42 by manipulating browser means 22 and accordingly a plurality of prerecorded text messages will play, one such example is "temperature setting". Again, selection of subsystem 44 corresponding to temperature setting is enabled by depressing switch 24 providing yet another plurality of subsystems corresponding to temperature settings, for example, high, low and medium or alternatively actual temperature settings in degrees Fahrenheit and/or Celsius. In this example, each of the prerecorded text messages is capable of being stored in system 30 during the initial installation of the same.

As an alternative, system 30 provides only an audible signal through prerecorded text messages for selection of subsystems. In this embodiment, each selection via switch 24 or escape from via switch 28 is confirmed by an audible tone or pre-recorded message.

As yet another alternative, system 30 is configured to provide only visual signals via a head up display or use of a video screen or equivalent thereof.

In yet another alternative, system 30 is provided with a menu selection for chasing the type of display (e.g. audio, visual or both).

Vehicle interface system 18 through the use of browsing means 22, selection means 24 and de-selection means 28 allows an individual or vehicle operator to send signals to adjust the position of vehicle components, and the operation levels of vehicle systems, such as temperature, radio volume, etc.

Figure 7:
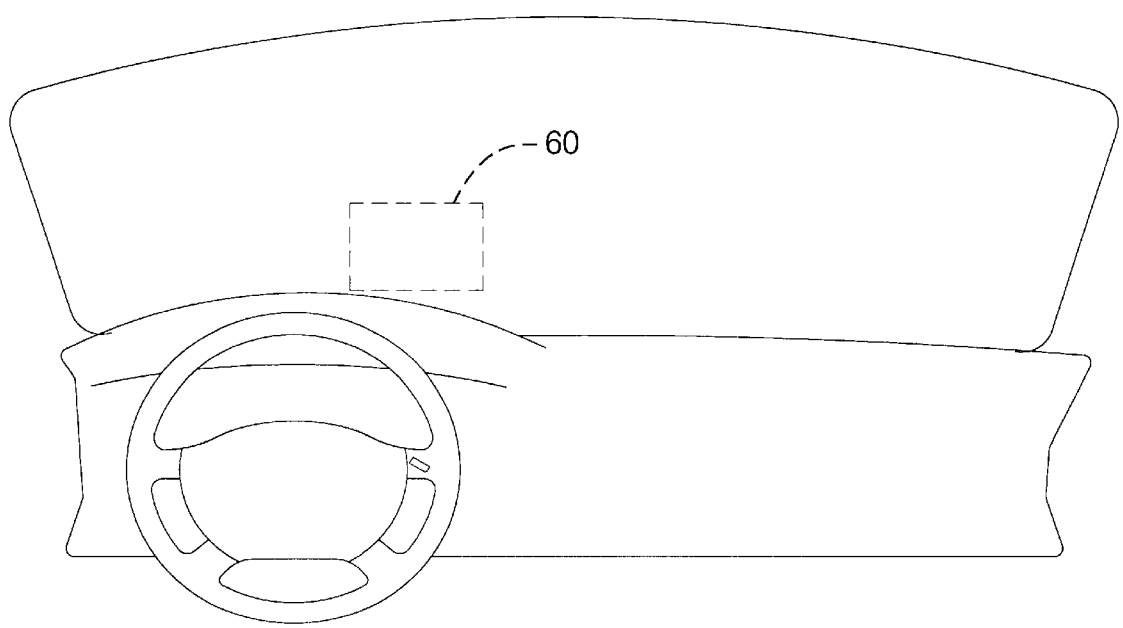
FIG. 7 is view of a visual display.

FIG. 7 shows a contemplated visual display 60 in the form of a head up display.

System 30 also includes prompts to subsystems in order to modify or adjust traditional vehicle components that are typically modified by vehicle operators and in particular, different vehicle operators. Such subsystems include systems for varying the location of a vehicle seat, adjusting the volume of the radio, and adjusting the position of side and rear mirrors.

As an alternative, system 30 is equipped with prestored default operating conditions for the subsystems, which correspond to a particular vehicle operator. For example, a first primary vehicle operator will have default preferred parameters stored in each of the applicable subsystems, such subsystems may include but are not limited to the following: drivers seat position; preferred audio system parameters; preferred environmental settings; and preferred mirror positions. Thus, and in accordance with this embodiment, and operator enters system 30 and scrolls through subsystems 32 until an audible signal "preferred conditions" is heard. The user then selects this subsystem through the manipulation of switch 24 and accordingly the vehicle systems capable of being manipulated by the control algorithm of system 30 are set to the corresponding default position.

It should be understood that other subsystems may be included, and those specifically disclosed herein are for illustration purposes.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for a vehicle, comprising:
    a visual display for providing selectable options corresponding to vehicle subsystems;
    a controller for activating said display, said controller being positioned on a spoke of a steering wheel and providing a means for selecting said selectable options of said visual display, said controller comprises a scroll switch, a selector switch, and an escape switch, wherein said scroll switch and said escape switch are positioned on an upper surface of said spoke and said selector switch is positioned on a lower surface of said spoke; and
    a plurality of prerecorded text messages corresponding to a plurality of selectable menus from said visual display, said plurality of prerecorded text messages being played upon selection of one of selectable menus.

2. The control system as in claim 1, wherein said scroll switch is angularly positioned on said upper surface of said spoke, the angular position of said scroll switch generally corresponding to the angular position of an individual's thumb when they are grasping said steering wheel as it is in a non-steering position.

3. The control system as in claim 2, wherein said selector switch is easily manipulated by an index finger of individual's hand and said escape switch is easily manipulated by an individual's thumb when they are grasping said steering wheel as it is in a non steering position.

4. The control system as in claim 1, wherein said video display is a head up display located on a portion of a windshield of the vehicle.

5. The control system as in claim 1, wherein said video display is a head up display located on a portion of a windshield of the vehicle.

6. A method for engaging a plurality of control systems in a vehicle, comprising:
 enabling a main menu of a main control program;
 providing a means for scrolling through a plurality of selections of said main menu;
 providing an audible text message for each of said plurality of selections, said audible text message being activated as an individual scrolls through said plurality of selections; and
 providing a selector switch for selecting one of said plurality of selections.

7. A method for engaging a plurality of control systems in a vehicle, comprising:
 enabling a main menu of a main control program;
 providing a means for scrolling through a plurality of selections of said main menu, wherein said means for scrolling through said plurality of selections is located on an upper surface of a spoke of a steering wheel;
 providing an audible text message for each of said plurality of selections, said audible text message being activated as an individual scrolls through said plurality of selections; and
 providing a selector switch for selecting one of said plurality of selections, said selector switch is located on a lower surface of said spoke.

8. The method as in claims 7, further comprising:
 providing a de-selector switch for un-selecting one of said plurality of selections, said de-selector switch being located on an upper surface of said spoke of said steering wheel.

9. The method as in claim 8, wherein said means for scrolling through said plurality of selections is angularly positioned on said upper surface of said spoke and said means for scrolling through said plurality of selections is easily manipulated by an individual's thumb when they are grasping said steering wheel as it is in a non steering position.

10. The method as in claim 9, wherein said means for scrolling through said plurality of selections is a scroll switch.

11. The method as in claim 7, further comprising:
 providing a visual representation of said main menu.

12. The method as in claim 11, wherein said visual representation is provided by a head up display located on a portion of a windshield of the vehicle.

13. The method as in claim 7, wherein said method further comprises:
 providing a de-selector switch for un-selecting one of said plurality of selections, said de-selector switch being located on said upper surface of said spoke of said steering wheel.

14. The method as in claim 7, further comprising:
 enabling a plurality of subsystems;
 providing a means for scrolling through said plurality of subsystems;
 providing an audible text message for each of said plurality of subsystems, said audible text message being activated as an individual scrolls through said plurality of selections; and
 providing a selector switch for selecting one of said plurality of subsystems.

15. The method as in claim 14, wherein each of said plurality of subsystems includes a plurality of menus with a plurality of selections and a plurality of audible text messages for each of said plurality of selections.

16. The method as in claim 15, wherein said plurality of subsystems includes: cruise control; radio control; climate control; seat positioning control; windshield wiper control; remote mirror control.

17. The method as in claim 14, wherein one of said plurality of said subsystems includes a means for inputting data.

18. The method as in claim 17, wherein said means for inputting data includes a means for recording voice messages for use as an audio text message when one of said subsystems is selected.

19. The method as in claim 14, wherein said plurality of subsystems provides access to a database of computer algorithms for controlling said plurality of subsystems.

20. A control system for a vehicle, comprising:
 a visual display for providing selectable options corresponding to vehicle subsystems;
 a controller for activating said display, said controller being positioned on a spoke of a steering wheel and providing a means for selecting said selectable options of said visual display, said controller comprises a scroll switch and a selector switch, wherein said scroll switch and said selector switch are positioned on an upper surface of said spoke; and
 a plurality of prerecorded text messages corresponding to a plurality of selectable options from said visual display, said plurality of prerecorded text messages being played as a user manipulates said scroll switch to change the selected options and upon selection of one of selectable options.

21. The control system as in claim 20, wherein said scroll switch is angularly positioned on said upper surface of said spoke, the angular position of said scroll switch generally corresponding to the angular position of an individual's thumb when they are grasping said steering wheel as it is in a non-steering position.

22. A method for engaging a plurality of control systems in a vehicle, comprising:
 enabling a main menu of a main control program;
 providing a hand operated device for scrolling through a plurality of selections of said main menu, wherein said hand operated device for scrolling through said plurality of selections is located on an upper surface of a spoke of a steering wheel;
 providing an audible text message for each of said plurality of selections, said audible text message being activated as an individual scrolls through said plurality of selections; and
 providing a selector switch for selecting one of said plurality of selections, said selector switch being located on an upper surface of said spoke.

23. The method as in claim 22, further comprising:
 enabling a plurality of subsystems, said hand operated device allows a user to scroll through said plurality of subsystems while operating the vehicle;
 providing an audible text message for each of said plurality of subsystems, said audible text message being activated as the user scrolls through said plurality of subsystems; and
 providing a selector switch for selecting one of said plurality of subsystems.

24. The method as in claim 23, wherein each of said plurality of subsystems includes a plurality of menus with a plurality of selections and a plurality of audible text messages for each of said plurality of selections.

25. The method as in claim 23, wherein one of said plurality of said subsystems includes a means for inputting data.

26. The method as in claim 25, wherein said means for inputting data includes a means for recording voice messages for use as an audio text message when one of said subsystems is selected.

27. A control system for a vehicle, comprising:

a visual display for providing selectable options corresponding to vehicle subsystems;

a controller for activating said display, said controller being positioned on a spoke of a steering wheel and providing a means for scrolling though said selectable options of said visual display; and a plurality of prerecorded text messages corresponding to a plurality of selectable menus from said visual display, said plurality of prerecorded text messages being played as a user scrolls through each of said selectable menus.

* * * * *